United States Patent
Raman et al.

(10) Patent No.: US 12,464,201 B2
(45) Date of Patent: Nov. 4, 2025

(54) HIGH QUALITY METADATA CREATION FOR CONTENT USING NOISY SOURCES

(71) Applicant: Roku, Inc., San Jose, CA (US)

(72) Inventors: Poornima Chozhiyath Raman, San Jose, CA (US); Thejaswi Raya, Fremont, CA (US); Aravindkumar Ilangovan, Santa Clara, CA (US); Nima Rad, San Francisco, CA (US); Iaroslav Zaitsev, Pleasanton, CA (US)

(73) Assignee: Roku, Inc., San Jose, CA (US)

( * ) Notice: Subject to any disclaimer, the term of this patent is extended or adjusted under 35 U.S.C. 154(b) by 27 days.

(21) Appl. No.: 18/598,002

(22) Filed: Mar. 7, 2024

(65) Prior Publication Data

US 2025/0287079 A1 Sep. 11, 2025

(51) Int. Cl.
*H04N 21/84* (2011.01)
*H04N 21/462* (2011.01)

(52) U.S. Cl.
CPC ......... *H04N 21/84* (2013.01); *H04N 21/4622* (2013.01)

(58) Field of Classification Search
CPC ............................ H04N 21/84; H04N 21/4622
See application file for complete search history.

(56) References Cited

U.S. PATENT DOCUMENTS

| | | |
|---|---|---|
| 2012/0143923 A1 | 6/2012 | Whitney et al. |
| 2014/0317668 A1 | 10/2014 | Zhang et al. |
| 2015/0012949 A1* | 1/2015 | Kulick ............... G06F 16/48 725/49 |
| 2019/0005130 A1 | 1/2019 | Tripoli et al. |
| 2019/0251476 A1* | 8/2019 | Shiebler ............... G06N 3/08 |
| 2019/0325259 A1 | 10/2019 | Murphy |
| 2021/0065094 A1 | 3/2021 | Mathiesen et al. |

OTHER PUBLICATIONS

International Search Report and Written Opinion directed to International Application No. PCT/US2024/061000, mailed Apr. 23, 2025; 8 pages.

* cited by examiner

*Primary Examiner* — Nnenna N Ekpo
(74) *Attorney, Agent, or Firm* — Sterne, Kessler, Goldstein & Fox P.L.L.C.

(57) ABSTRACT

Disclosed herein are system, apparatus, device, method and/or computer program product aspects, and/or combinations and sub-combinations thereof, for creating high quality metadata and/or images for content. An example aspect operates by a computer-implemented method including receiving, from a plurality of sources, a set of metadata associated with an item of content. The method further includes determining a first quality metric for each metadata of the set of metadata, determining a set of quality metrics for attributes of each metadata of the set of metadata, and determining a second quality metric for each metadata of the set of metadata based on the set of quality metrics. The method further includes generating a final metadata based at least on the set of metadata, the first quality metric, and the second quality metric and providing the item of content and the final metadata associated with the item of content.

20 Claims, 5 Drawing Sheets

HIGH QUALITY METADATA CREATION FOR CONTENT USING NOISY SOURCES

BACKGROUND

Field

This disclosure is generally directed to methods and systems for creating high quality metadata for content, and more particularly to methods and systems for creating the high quality metadata using metadata from noisy sources.

SUMMARY

Provided herein are system, apparatus, article of manufacture, method and/or computer program product aspects, and/or combinations and sub-combinations thereof, for creating high quality metadata and/or images for content. For example, system, apparatus, article of manufacture, method and/or computer program product aspects, and/or combinations and sub-combinations thereof are provided for using metadata and other information from noisy source to generate the high quality metadata for content.

An example aspect operates by a computer-implemented method. The method includes receiving, by at least one computer processor and from a plurality of sources, a set of metadata associated with an item of content. The method further includes determining a first quality metric for each metadata of the set of metadata and determining a set of quality metrics for attributes of each metadata of the set of metadata. The method further includes determining a second quality metric for each metadata of the set of metadata based on the set of quality metrics. The method further includes generating a final metadata based at least on the set of metadata, the first quality metric, and the second quality metric and providing the item of content and the final metadata associated with the item of content, where the item of content includes at least an episode in a series.

The method can further include receiving, from a second plurality of sources, a plurality of images associated with the item of content, determining an image quality metric for each image of the plurality of images, and selecting an image from the plurality of images based on the image quality metric.

The first quality metric can include a completeness metric and determining the first quality metric for each metadata can include comparing attributes of first metadata to attributes of other metadata of the set of metadata and determining whether the attributes of the other metadata include information not present in the attributes of the first metadata. The method can further include determining the first quality metric for the first metadata based at least on determining whether the attributes of the other metadata include information not present in the attributes of the first metadata.

The method can further include receiving, from the plurality of sources, a second set of metadata, selecting, from the second set of metadata, the set of metadata associated with the item of content, and linking the set of metadata for generating the final metadata.

In some aspects, selecting the set of metadata can include using an embedding model to select the set of metadata. In some aspects, linking the set of metadata can include using a logistic regression model to link the set of metadata. In some aspects, linking the set of metadata can include using a logistic deduplication model to link the set of metadata.

In some aspects, the final metadata can include a plurality of attributes determined from the attributes of each metadata of the set of metadata based at least on the first quality metric and the second quality metric. The plurality of metadata can include at least one or more of a title of the series, a title of the episode, a description of the episode, cast information of the episode, quality information associated with the episode, or a duration of the episode.

The method can further include determining a first source quality metric for each source of the plurality of sources based on the first quality metric of each metadata of the set of metadata associated with the corresponding source. The method can further include determining a second source quality metric for each source of the plurality of sources based on the second quality metric of each metadata of the set of metadata associated with the corresponding source.

The method can further include displaying, on a display device associated with a media device, the final metadata and displaying, on the display device associated with the media device, information associated with one or more sources of the plurality of sources that carry the item of content.

An example aspect operates by a non-transitory computer-readable medium having instructions stored thereon that, when executed by at least one computing device, cause the at least one computing device to perform operations. The operations can include receiving, from a plurality of sources, a set of metadata associated with an item of content. The operations further include determining a first quality metric for each metadata of the set of metadata and determining a set of quality metrics for attributes of each metadata of the set of metadata. The operations further include determining a second quality metric for each metadata of the set of metadata based on the set of quality metrics. The operations further include generating a final metadata based at least on the set of metadata, the first quality metric, and the second quality metric and providing the item of content and the final metadata associated with the item of content, where the item of content include at least an episode in a series.

An example aspect operates by a system including one or more memories and at least one processor each coupled to at least one of the memories. The at least one processor is configured to perform operations including receiving, from a plurality of sources, a set of metadata associated with an item of content. The operations further include determining a first quality metric for each metadata of the set of metadata and determining a set of quality metrics for attributes of each metadata of the set of metadata. The operations further include determining a second quality metric for each metadata of the set of metadata based on the set of quality metrics. The operations further include generating a final metadata based at least on the set of metadata, the first quality metric, and the second quality metric and providing the item of content and the final metadata associated with the item of content, where the item of content include at least an episode in a series.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

A user of a media system can request and access content (such as, but not limited to, TV shows, movies, or the like). The content can be available on different sources. These different content sources can provide noisy and incomplete metadata associated with the content. Additionally, or alternatively, other data sources can also provide noisy and incomplete metadata associated with the content. It can be challenging to decide which one is accurate and pick the metadata to be used for further processing.

Provided herein are system, apparatus, article of manufacture, method and/or computer program product aspects, and/or combinations and sub-combinations thereof, for creating high quality metadata and/or images for content. For example, system, apparatus, article of manufacture, method and/or computer program product aspects, and/or combinations and sub-combinations thereof are provided for using metadata and other information from noisy source to generate the high quality metadata for content.

Figure 1:
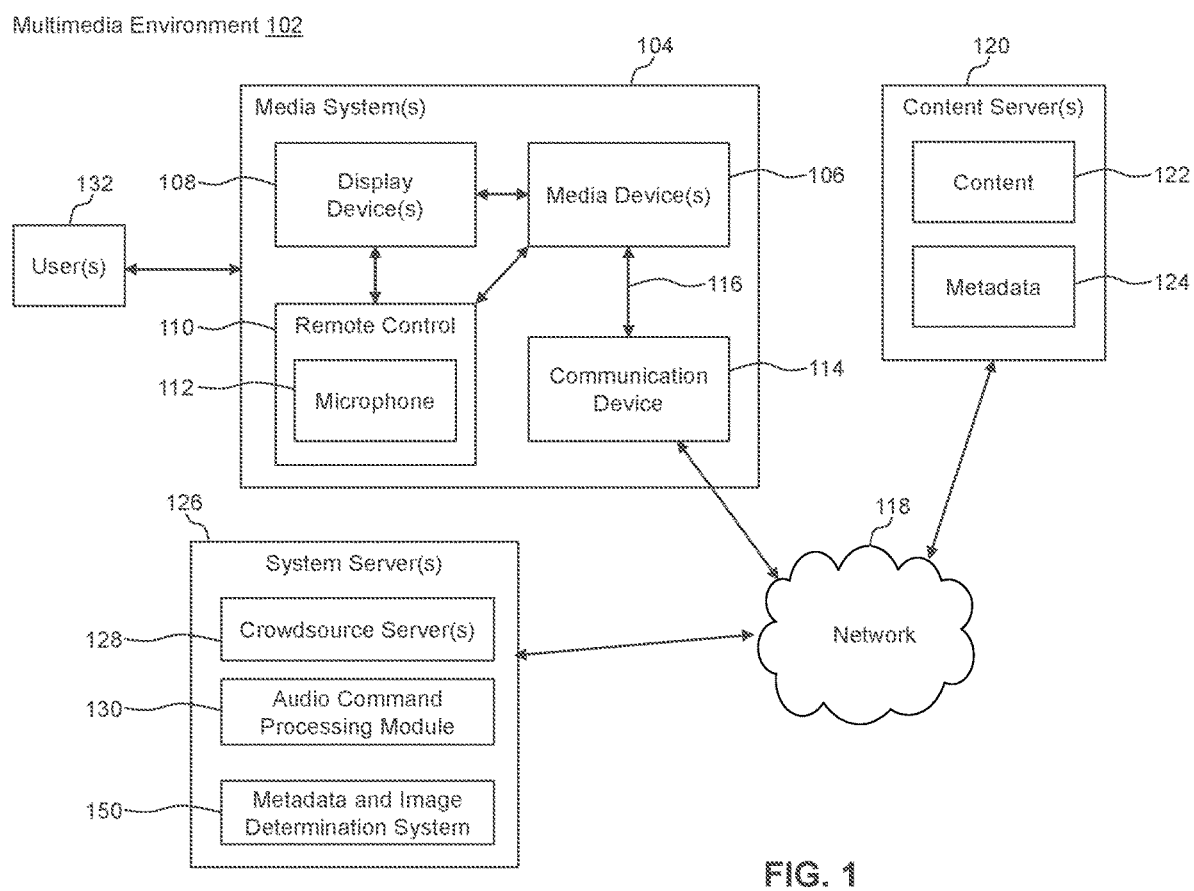
FIG. 1 illustrates a block diagram of a multimedia environment, according to some aspects.

Various aspects of this disclosure may be implemented using and/or may be part of a multimedia environment 102 shown in FIG. 1. It is noted, however, that multimedia environment 102 is provided solely for illustrative purposes, and is not limiting. Aspects of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102 that can include a metadata and image determination system, according to some aspects. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some aspects, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, where the link 116 may include wireless (such as WiFi) and/or wired connections.

In various aspects, the network 118 can include, without limitation, wired and/or wireless intranet, extranet, Internet, cellular, Bluetooth™, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, a laptop computer, an smartphone, a wearable device, on-screen controls, integrated control buttons, audio controls, or any combination thereof, to name just a few examples. In an aspect, the remote control 110 wirelessly communicates with the media device 106 and/or display device 108 using cellular, Bluetooth™, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some aspects, metadata 124 includes data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing aspects and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some aspects, the media device 106 may be audio responsive, and the audio data may represent verbal commands from the user 132 to control the media device 106 as well as other components in the media system 104, such as the display device 108.

In some aspects, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
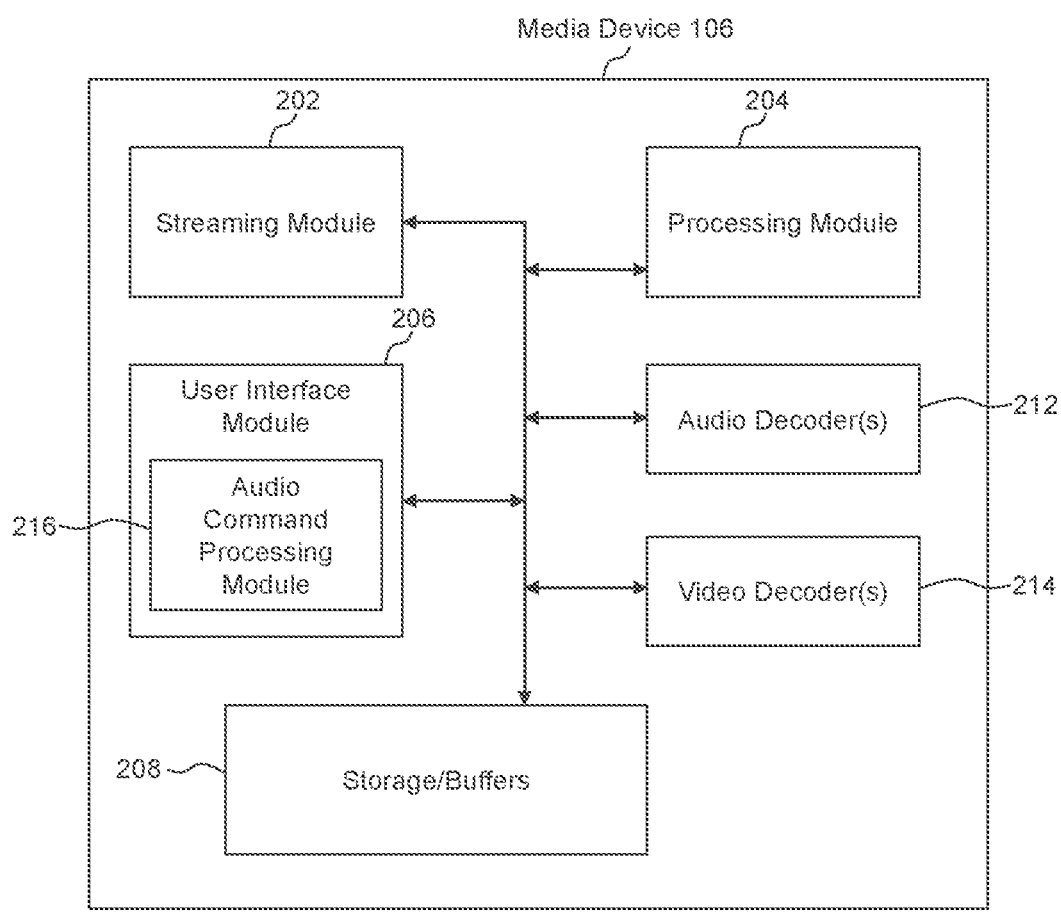
FIG. 2 illustrates a block diagram of a streaming media device, according to some aspects.

In some aspects, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

In some aspects, the system servers 126 may also include metadata and image determination system 150. The metadata and image determination system 150 can be configured to perform operations to determine and/or generate authoritative metadata for items of content that are more complete and/or are more accurate. Additionally, or alternatively, the metadata and image determination system 150 can be configured to perform operations to determine and/or select images for items of content that are more complete and/or are more accurate. For example, as discussed in more detail below, the metadata and image determination system 150 can be configured to receive a plurality of metadata from one or more sources, group a set of the metadata (from the plurality of metadata) associated to one item of content into a cluster, determine the completeness and correctness of the set of metadata, generate one or more quality metrics for the set of metadata, and generate (or determine) an authoritative metadata for the item of content based at least on the set of metadata and the quality metrics. The metadata and image determination system 150 can provide the authoritative metadata for presentation (to, for example, a user) with the item of content.

Additionally, or alternatively, the metadata and image determination system 150 can be configured to receive a plurality of images from one or more sources, group a set of the images (from the plurality of images) associated to one item of content into a cluster, determine the completeness and correctness of the set of images, generate one or more quality metrics for the set of images, and generate (or determine or select) an authoritative image for the item of content based at least on the set of images and the quality metrics. The metadata and image determination system 150 can provide the authoritative image for presentation (to, for example, a user) with the item of content.

The structural and functional aspects of the metadata and image determination system 150 may wholly or partially exist in the same or different ones of the system servers 126. Additionally, or alternatively, the structural and functional aspects of the metadata and image determination system 150 may exist in the media devices 106, the content servers 120, or a combination thereof. Additionally, or alternatively, the structural and functional aspects of the metadata and image determination system 150 may exist as a separate entity.

FIG. 2 illustrates a block diagram of an example media device 106, according to some aspects. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some aspects, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming aspects, the streaming module 202 may transmit the content to the display device 108 in real time or near real time as it receives such content from the content server(s) 120. In non-streaming aspects, the media device 106 may store the content received from content server(s) 120 in storage/buffers 208 for later playback on display device 108.

Metadata and Image Determination System

Figure 3:
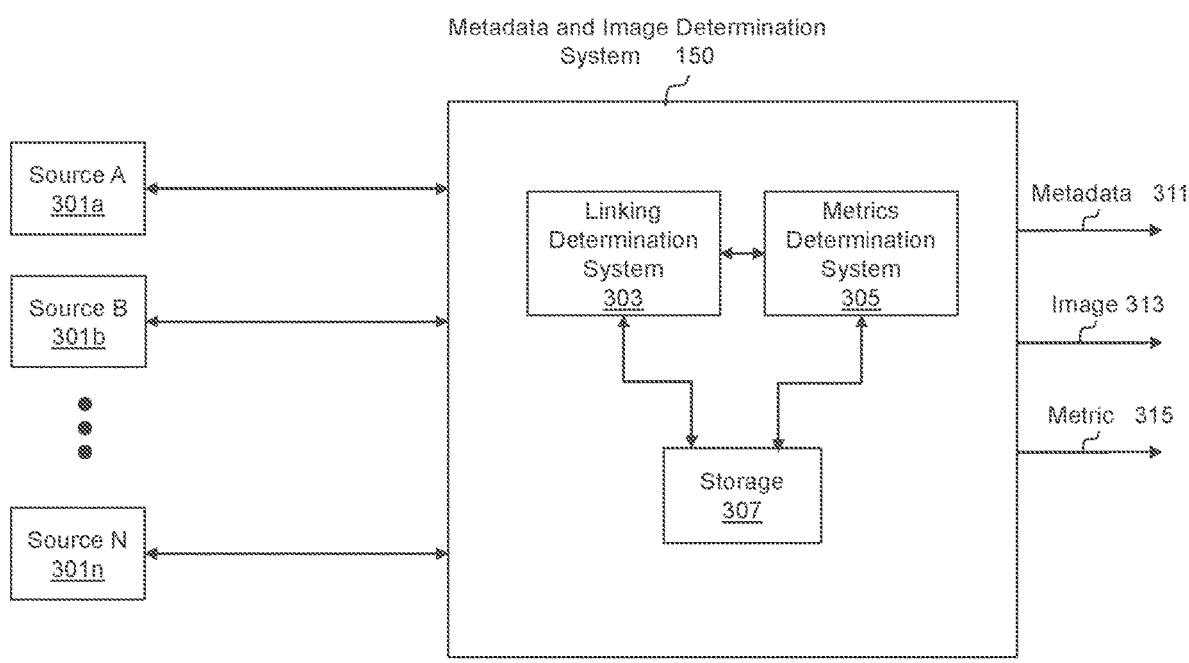
FIG. 3 illustrates a block diagram of an example metadata and image determination system, according to some aspects.

FIG. 3 illustrates a block diagram of an example metadata and image determination system 150, according to some aspects. According to some aspects, the metadata and image determination system 150 can include a linking determination system 303, a metrics determination system 305, and a storage 307. However, the aspects of this disclosure are not limited to these examples, and the metadata and image determination system 150 can include other systems and/or modules. Also, although the linking determination system 303 and the metrics determination system 305 are illustrated as separate systems and/or modules, the components of these systems can be combined in one or more systems and/or modules. Also, the storage 307 can be part of the metadata and image determination system 150, can be part of the system servers 126, the media systems 104, and/or the content servers 120. Additionally, or alternatively, storage 307 can be a separate storage device coupled to the metadata and image determination system 150, can be part of the system servers 126, the media systems 104, and/or the content servers 120.

The metadata and image determination system 150 can receive content, metadata associated with content, and/or images associated with content. The metadata and image determination system 150 can provide the received (and/or modified versions of) content, the received (and/or modified versions of) metadata associated with the content, and/or the received (and/or modified versions of) images associated with content to, for example, media system 104 for presentation to, for example, user 132.

According to some aspects, the metadata and image determination system 150 can receive content, metadata associated with content, and/or images associated with content from one or more sources. For example, the metadata and image determination system 150 can receive content, metadata associated with content, and/or images associated with content from source A 301a, source B 301b, and source N 101n (referred to singularly as source 301 or collectively as sources 301). According to some aspects, one or more of sources 301 can include the content server 120 configured to provide the content, metadata associated with the content, and/or images associated with the content to the metadata and image determination system 150. Additionally, or alternatively, one or more of sources 301 can include sources configured to provide metadata associated with the content and/or images associated with the content (and not the content) to the metadata and image determination system 150. For example, the sources 301 can include content providers (e.g., content server(s) 120 of FIG. 1) and/or data providers. The metadata can include the metadata 124 of FIG. 1. However, the aspects of this disclosure are not limited to these examples and the sources 301 can include any other sources configured to provide one or more of content, metadata associated with content, and/or images associated with content.

According to some aspects, the content can be movies. Additionally, or alternatively, the content can be an episode of an episodic content. According to some aspects, the episodic content includes a content having one or more episodes. For example, the episodic content can include one or more seasons and each season of the episodic content can include one or more episodes. The episodic content can include any type of shows with one or more episodes. The content can include other types of videos and/or audios. In some examples, the content may be also multi-lingual, such as, but not limited to, one or more a particular language, localization, a country of origin, a source type, a content type, or the like. However, the aspects of this disclosure are not limited to these examples and types of content, and the content can include one or more of sports, music, music videos, persons, artwork, audiobooks, audio recordings, their subclasses, or the like received from the sources 301.

The metadata and image determination system 150 is configured to receive a set of metadata from the sources 301. According to some aspects, the metadata and image determination system 150 receives one or more metadata of the set of metadata from one or more of sources 301 when the metadata and image determination system 150 receives an item of content from these sources. For example, the metadata and image determination system 150 can send a request for the item of content to one or more of the sources 301 and can receive one or more of the set of metadata when the metadata and image determination system 150 receives the requested item of content.

Additionally, or alternatively, the metadata and image determination system 150 can receive one or more metadata of the set of metadata from one or more of sources 301 without receiving the item of content from these sources. For example, the metadata and image determination system 150 can send a request to one or more of sources 301 for metadata associated with the item of content. The metadata and image determination system 150 can send information associated with the item of content to the one or more of sources 301 and request, from the one or more of sources, the metadata associated with the item of content. These one or more of sources 301 can provide the requested metadata without providing the item of content. The information associated with the item of content sent by the metadata and image determination system 150 can include any information that can identify the item of content.

Each of the received metadata can include one or more attributes. The attributes can include associated or ancillary information indicating or related to writer, director, producer, composer, artist, actor, summary, chapters, production, history, year, trailers, alternate versions, related content, applications, and/or any other information pertaining or relating to an item of content In some aspects, different content types can have different attributes. For example, if the item of content is a movie, the movie can have a first set of attributes for its metadata. If the item of content is an episode of episodic content, the episode can have a second set of attributes. In some aspects, the first set of attributes is the same as the second set of attributes. In some aspects, the first set of attributes is different than the second set of attributes. For example, the first set of attributes can include, but is not limited to, a title of the item of content, a description of the item of content, a cast of the item of content, a release data of the item of content, a duration of the item of content, quality information (such as resolution or like) of the item of content, the date that the item of content is available on a source 301, or the like. The second set of attributes can include, but is not limited to, a title of the series of the item of content, a title of the episode (the item of content), a season number, an episode number, a description of the item of content, a cast of the item of content, a release data of the item of content, a release date of the season of the item of content, a duration of the item of content, quality information (such as resolution or like) of the item of content, the date that the item of content is available on a source 301, or the like.

After receiving the set of metadata, the metadata and image determination system 150 can be configured to determine (e.g., calculate) one or more quality metrics based at least on the received set of metadata. As discussed in more detail below, the metadata and image determination system 150 is configured to determine the one or more quality metrics, for each metadata of the set of metadata, for each source 301 of the set of metadata, and/or for a combination thereof. For example, the metadata and image determination system 150 can determine a first quality metric (e.g., a completeness metric or a completeness score) for each metadata of the set of metadata. According to some aspects, the first quality metric can indicate how "complete" a metadata of the set of metadata is. Additionally, or alternatively, the metadata and image determination system 150 can determine a second quality metric (e.g., an accuracy (correctness) metric or accuracy score) for each metadata of the set of metadata. The second quality metric can indicate how "accurate" one or more attributes of each metadata are.

According to some aspects, the metadata and image determination system 150 determines the first quality metric and/or the second quality metric on an item of content level and/or on source level.

Based at least on the set of metadata, the first quality metric, and/or the second quality metric the metadata and image determination system 150 can generate a final metadata 311. In some aspects, the metadata and image determination system 150 can generate the final metadata 311 from the attributes of the set of metadata based at least on the first quality metric and/or the second quality metric. For example, the metadata and image determination system 150 can choose different attributes from different metadata of the set of metadata based at least on the first quality metric and/or the second quality metric to generate the final metadata 311. Additionally, or alternatively, the metadata and image determination system 150 can select one metadata from the set of metadata based at least on the first quality metric and/or the second quality metric to generate the final metadata 311. The metadata and image determination system 150 can be configured to enrich the final metadata 311 based at least on the set of metadata, the first quality metric, and/or the second quality metric.

Although the first quality metric and/or the second quality metric are discussed for deriving and/or generating the final metadata, the aspects of this disclosure are not limited to the first quality metric and/or the second quality metric. Any number of layers (of, for example, quality metrics), any hierarchal complexity, and/or any indirect references can be used to produce the final metadata.

The metadata and image determination system 150 can provide the final metadata 311 to, for example, the media system 104. In some aspects, the metadata and image determination system 150 can also provide the item of content (e.g., the content 122) to the media system 104. The final metadata 311 is associated with the item of content. In some aspects, the metadata and image determination system 150 can also send one or more of the first quality metric and the second quality metric to, for example, the media system 104 or other systems.

According to some aspects, the metadata and image determination system 150 can include the linking determination system 303. The linking determination system 303 is configured to receive metadata from one or more sources 301. The linking determination system 303 is configured to determine the set of metadata from the received metadata that are associated with the same item of content. The linking determination system 303 then links the set of metadata to a cluster associated with the item of content. In some examples, the linking determination system 303 can select the set of metadata using an embedding machine learning model. Additionally, or alternatively, the linking determination system 303 can link the set of metadata using a logistic regression model. Additionally, or alternatively, the linking determination system 303 can link the set of metadata using a deduplication model. However, the aspects of this disclosure are not limited to these examples and other models (including but not limited to machine learning models and/or artificial intelligent (AI) models) can be used for selecting and/or linking the set of metadata associated with the item of content.

According to some aspects, the linking determination system 303 can use one or more attributes of each metadata for selecting (and linking) the set of metadata that are associated with the same item of content. In a non-limiting example, the linking determination system 303 can use a title attribute of each metadata for selecting (and linking) the set of metadata that are associated with the same item of content. In another example, the linking determination system 303 can use a description attribute of each metadata for selecting (and linking) the set of metadata that are associated with the same item of content. In another example, the linking determination system 303 can use a release date attribute of each metadata for selecting (and linking) the set of metadata that are associated with the same item of content. However, the aspects of this disclosure are not limited to these examples and the linking determination system 303 can use other attribute(s) and/or combination of attributes of each metadata for selecting (and linking) the set of metadata that are associated with the same item of content.

According to some aspects, the linking determination system 303 can receive the metadata periodically from the sources 301. Additionally, or alternatively, the linking determination system 303 can receive the metadata aperiodically from the sources 301. Additionally, or alternatively, the linking determination system 303 can receive the metadata from the sources 301 after the linking determination system 303 sending a request for metadata to the sources 301.

According to some aspects, the metadata received by the linking determination system 303 can have different formats. The linking determination system 303 can include a formatting module (not shown) configured to reformat the received metadata into a uniform format before the selecting and/or linking processes.

According to some aspects, the linking determination system 303 is configured to store the received metadata (formatted or non-formatted), the set of metadata (formatted or non-formatted), the cluster of metadata (formatted or non-formatted), or the like in the storage 307. The stored metadata can later be analyzed by the metadata and image determination system 150 even if that metadata is not provided by its source anymore. After selecting and/or linking the set of metadata that are associated with the same item of content, the set of metadata are input to the metrics determination system 305 of the metadata and image determination system 150. In some aspects, the metrics determination system 305 receives the set of metadata from the linking determination system 303. Additionally, or alternatively, the metrics determination system 305 receives (e.g., retrieves) the set of metadata from the storage 307.

The metrics determination system 305 is configured to determine one or more quality metrics for the set of metadata. According to some aspects, the metrics determination system 305 is configured to determine (e.g., calculate) the first quality metric (e.g., a completeness metric or a completeness score) for each metadata of the set of metadata. The first quality metric can indicate how "complete" a metadata of the set of metadata is. Additionally, or alternatively, the metrics determination system 305 can determine (e.g., calculate) the second quality metric (e.g., an accuracy (correctness) metric or accuracy score) for each metadata of the set of metadata. The second quality metric can indicate how "accurate" one or more attributes of each metadata are.

According to some aspects, for determining the first quality metric, the metrics determination system 305 can determine, for each metadata of the set of metadata, the non-empty attributes of that metadata. The metrics determination system 305 can compare the number of non-empty attributes of for each metadata of the set of metadata with other metadata of the set of metadata to determine which metadata has more non-empty attributes. Additionally, or alternatively, the metrics determination system 305 can weigh the attributes before the comparison. In these aspects, some attributes can be more important than other attributes for determining the first quality metric, and therefore, those attributes can have a higher weight. Additionally, or alternatively, the metrics determination system 305 can compare the number of non-empty attributes of each metadata of the set of metadata with a threshold for determining the first quality metric.

According to some aspects, the metrics determination system 305 can determine the first quality metric for each metadata it receives from the sources 301 (e.g., at content level). Additionally, or alternatively, the metrics determination system 305 can determine the first quality metric for each source 301 (e.g., at source level). In these aspects, the metrics determination system 305 can determine the first quality metric for, for example, source A 301a based on one or more first quality metrics determined for the metadata from source A 301a. In a non-limiting example, the metrics determination system 305 can determine the first quality metric for source A 301a based on a statistical average of one or more first quality metrics determined for the metadata from source A 301a. The metrics determination system 305 can store the determined first quality metrics at storage 307 for further analysis and/or use. However, other methods such as, but not limited to, statistical methods, AI/ML models, heuristics, and/or any combination of methods can be used to determine the first quality metric.

According to some aspects, for determining the second quality metric, the metrics determination system 305 can determine a set of quality metrics for attributes of each metadata of the set of metadata. In other words, metrics determination system 305 can determine an accuracy quality metric for each attribute (e.g., each non-empty attribute) of each metadata of the set of metadata. The metrics determination system 305 can then determine the second quality metric for the metadata based on the set of accuracy quality metrics of the attributes of that metadata. In some aspects, the metrics determination system 305 can determine the second quality metric as a vector including the set of accuracy quality metrics of the attributes. In some aspects, the metrics determination system 305 can determine the second quality metric as an average (e.g., a weighted average) of the set of accuracy quality metrics of the attributes. In some aspects, the metrics determination system 305 can determine the second quality metric as other statistical average of the set of accuracy quality metrics of the attributes. However, the aspects of this disclosure are not limited to these examples, and the metrics determination system 305 can determine the second quality metric as any function of the set of accuracy quality metrics of the attributes such as, but not limited to, statistical methods, AI/ML models, heuristics, and/or any combination of methods.

According to some aspects, in order to determine the accuracy quality metric of each attribute, the metrics determination system 305 is configured to compare the information of that attribute across the set of metadata. Depending on the comparison, the metrics determination system 305 can determine the accuracy quality metric for that attribute. In a non-limiting example, the metrics determination system 305 can compare the information of the title attribute between the metadata of the set of metadata. For the attributes with similar information in the title attribute, those attributes can be rewarded. For attribute with different information in the title attribute, those attributes can be penalized. Therefore, the metrics determination system 305 can determine the accuracy quality metric for the title attribute accordingly. Additionally, or alternatively, in order to determine the accuracy quality metric of each attribute, the metrics determination system 305 is configured to compare the information of that attribute with stored information (e.g., stored in storage 307). However, the aspects of this disclosure are not limited to these examples, and other methods (such as but not limited to embedding machine learning models, logistic regression models, deduplication models, or other machine learning models and/or AI models) can be used to determine the set of accuracy quality metrics.

According to some aspects, the metrics determination system 305 can determine the second quality metric for each metadata it receives from the sources 301 (e.g., at content level). Additionally, or alternatively, the metrics determination system 305 can determine the second quality metric for each source 301 (e.g., at source level). In these aspects, the metrics determination system 305 can determine the second quality metric for, for example, source A 301a based on one or more second quality metrics determined for the metadata from source A 301a. In a non-limiting example, the metrics determination system 305 can determine the second quality metric for source A 301a based on a statistical average of one or more second quality metrics determined for the metadata from source A 301a. However, other methods such as, but not limited to, statistical methods, AI/ML models, heuristics, and/or any combination of methods can be used to determine the second quality metric. The metrics determination system 305 can store the determined second quality metrics at storage 307 for further analysis and/or use.

According to some aspects, the linking determination system 303 and the metrics determination system 305 can be configured to use the same analysis (and models) to determine the first quality metric and the second quality metric for different content. Additionally, or alternatively, the linking determination system 303 and the metrics determination system 305 can be configured to use the different analysis (and models) to determine the first quality metric and the second quality metric for different content. For example, a movie content and an episode of an episodic content can have different types of attributes and different types of information in their corresponding metadata. Therefore, the linking determination system 303 and the metrics determination system 305 can use the different analysis (and models) to determine the first quality metric and the second quality metric for different content. For example, the metadata of the episode of the episodic content has information for the series, for the season of the series, and for the episode of the series where a movie may not have these information. Also, for similar types of attributes between movies and series, these attributes can have different information/data. For example, different episodes of a TV series can have different cast, director, release data, etc. But these attributes for the movie would have one set of information.

In addition to the content level and/or source level, the metadata and image determination system 150 can determine the first quality metric and/or the second quality metric at season level and/or at series level for episodic content.

In addition to, alternatively to, determining the first quality metric and/or the second quality metric, the metadata and image determination system 150 can be configured to determine image quality metric (e.g., image quality score) for images associated with the items of content. According to some aspects, each item of content can have one or more images associated with the item of content. In some example, the image associated with the item of content can include a poster image, a background image, or the like associated with the item of content.

According to some aspects, the linking determination system 303 of the metadata and image determination system 150 can receive one or more images from one or more of sources 301. The linking determination system 303 is configured to determine a set of image's from the received images that are associated with the same item of content. The linking determination system 303 then links the set of images to a cluster associated with the item of content. In some examples, the linking determination system 303 can select the set of images using an embedding machine learning model. Additionally, or alternatively, the linking determination system 303 can link the set of images using a logistic regression model. Additionally, or alternatively, the linking determination system 303 can link the set of images using a deduplication model. However, the aspects of this disclosure are not limited to these examples and other models (including but not limited to machine learning models and/or artificial intelligent (AI) models) can be used for selecting and/or linking the set of images associated with the item of content.

According to some aspects, the linking determination system 303 can use one or more information/data of each images for selecting (and linking) the set of images that are associated with the same item of content. In a non-limiting example, the linking determination system 303 can use title information of each image for selecting (and linking) the set of images that are associated with the same item of content. In another example, the linking determination system 303 can use description information of each image for selecting (and linking) the set of images that are associated with the same item of content. In another example, the linking determination system 303 can use release date information of each images for selecting (and linking) the set of images that are associated with the same item of content. However, the aspects of this disclosure are not limited to these examples and the linking determination system 303 can use other combination of each images for selecting (and linking) the set of images that are associated with the same item of content.

According to some aspects, the linking determination system 303 can receive the images periodically from the sources 301. Additionally, or alternatively, the linking determination system 303 can receive the images aperiodically from the sources 301. Additionally, or alternatively, the linking determination system 303 can receive the images from the sources 301 after the linking determination system 303 sending a request for images to the sources 301. According to some aspects, the images received by the linking determination system 303 can have different formats. The linking determination system 303 can include a formatting module (not shown) configured to reformat the received images into a uniform format before the selecting and/or linking processes. According to some aspects, the linking determination system 303 is configured to store the received images (formatted or non-formatted), the set of images (formatted or non-formatted), the cluster of images (formatted or non-formatted), or the like in the storage 307. The stored images can later be analyzed by the images and image determination system 150 even if that images is not provided by its source anymore.

After selecting and/or linking the set of images that are associated with the same item of content, the set of images are input to the metrics determination system 305 of the metadata and image determination system 150. In some aspects, the metrics determination system 305 receives the set of images from the linking determination system 303. Additionally, or alternatively, the metrics determination system 305 receives (e.g., retrieves) the set of images from the storage 307.

The metrics determination system 305 is configured to determine one or more image quality metrics for the set of images. The metrics determination system 305 can determine one image quality metric for each image. The image quality metric can include whether the image is blank or not, can include information regarding the resolution of the image, can include information whether measurements are valid or not, can include information whether the text on image matches some attributes of the metadata of the item of content, can include information whether the text is in the language local to where the item of content is to be shown, can include information whether the content of the image needs to be moderated (e.g., for appropriate audience), can include information regarding aspect ratio, can include information regarding image size, or the like.

According to some aspects, the metrics determination system 305 can determine the image quality metric for each image it receives from the sources 301 (e.g., at content level). If the metrics determination system 305 receives multiple images for each item of content from one source 301, the metrics determination system 305 can determine the image quality metric for each image and/or the image quality metric all the image for that item of content for that source. Additionally, or alternatively, the metrics determination system 305 can determine the image quality metric for each source 301 (e.g., at source level). In these aspects, the metrics determination system 305 can determine the image quality metric for, for example, source A 301a based on one or more image quality metrics determined for the images from source A 301a. In a non-limiting example, the metrics determination system 305 can determine the image quality metric for source A 301a based on a statistical average of one or more image quality metrics determined for the images from source A 301a. However, other methods such as, but not limited to, statistical methods, AI/ML models, heuristics, and/or any combination of methods can be used to determine the image quality metric. The metrics determination system 305 can store the determined image quality metrics at storage 307 for further analysis and/or use.

According to some aspects, the metadata and image determination system 150 (e.g., using the linking determination system 303 and/or the metrics determination system 305) to determine an image for the item of content based on the determined image quality metrics. For example, the metadata and image determination system 150 can choose an image when a determined image quality metric satisfies a condition. For example, the metadata and image determination system 150 can compare the determined image quality metric with an image threshold. The metadata and image determination system 150 can choose an image that has an image quality metric above the image threshold. Additionally, or alternatively, metadata and image determination system 150 can compare the determined image quality metrics with each other and choose an image that has the highest value of image quality metric. The metadata and image determination system 150 can provide the selected image (e.g., image 313) to, for example, media system 104 for presentation to user 132.

Additionally, or alternatively, the metadata and image determination system 150 can provide metric(s) 315 (e.g., one or more of the first quality metric, the second quality metric, and/or the image quality metric) to, for example, media system 104 or content server 120 for further analysis and/or for further use.

In addition to determining, storing, and/or using the first quality metric, the second quality metric, and/or the image quality metric at content level and/or at source level, the metadata and image determination system 150 can be configured to determine a combination of the first quality metric, the second quality metric, and/or the image quality metric at content level and/or at source level. For example, for each item of content, the metadata and image determination system 150 can determine a score that is a combination of one or more of the first quality metric, the second quality metric, and the image quality metric for that item of content. As another example, for each source, the metadata and image determination system 150 can determine a score that is a combination of one or more of the first quality metric, the second quality metric, and the image quality metric for that source.

According to some aspect, since the metadata and image determination system 150 can store a history of metric (e.g., the first quality metric, the second quality metric, and/or the image quality metric at content level and/or at source level), the metadata and image determination system 150 can also determine anomalies. For, example, if a source 301 has a usual high metric and/or has historic high metrics, a low metric for that source 301 can be determined by the metadata and image determination system 150 as an anomaly score for that source 301.

The aspects of this disclosure are not limited to any particular set of metadata and/or attributes of the metadata. The metadata and image determination processes of this disclosure can be used with (and/or use) any set of attributes, assets, metadata, and/or their combination. According to some aspects, the metadata and image determination processes of this disclosure can involve pre-processing and extracting additional information from the provided content and/or image. The additional information can include, but is not limited to, images, videos, audio recordings. The additional information can be from any particular set, source, origin, etc. According to some aspects, methods of extraction and deduplication can involve any hierarchal methods, statistical models, ML/AI models, heuristics, and/or any combination thereof.

Figure 4:
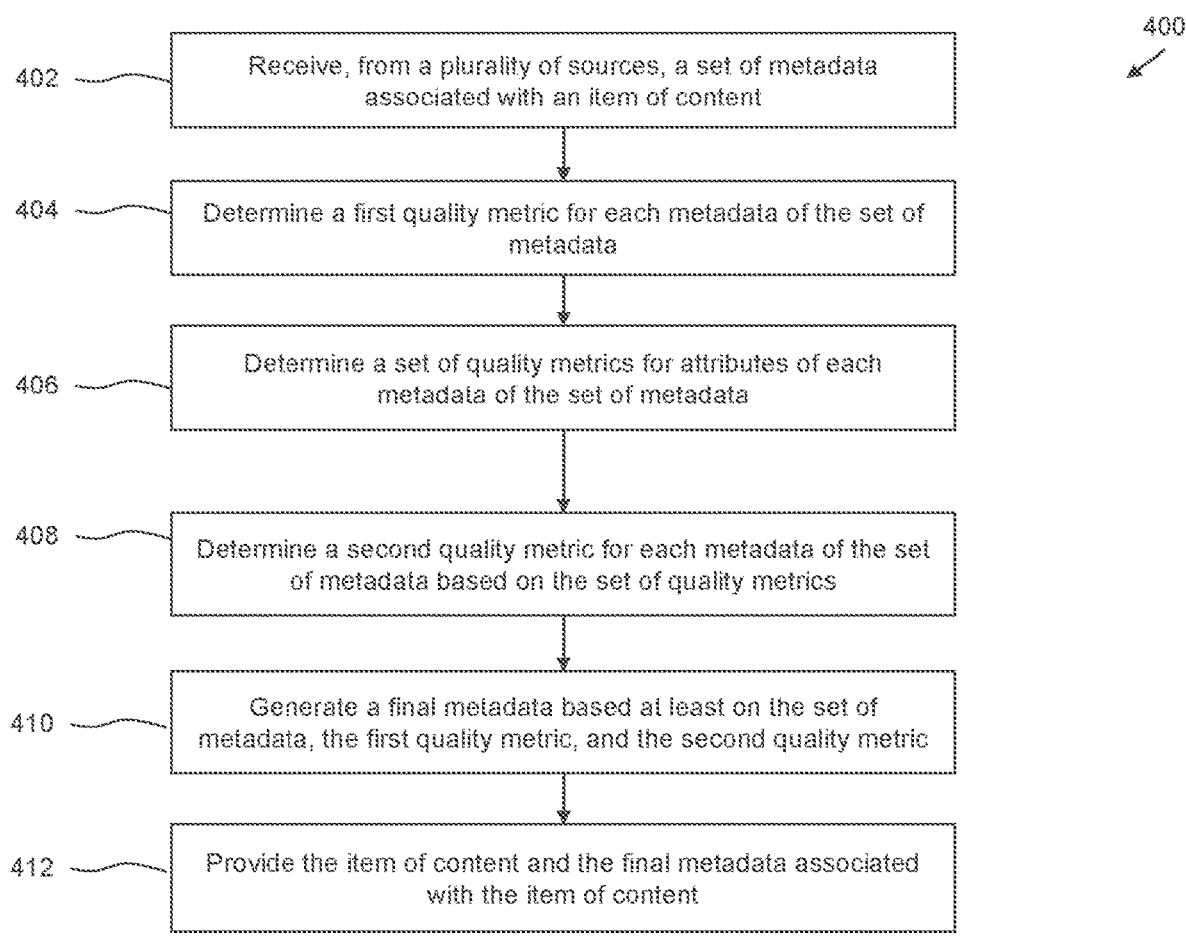
FIG. 4 illustrates one exemplary method for metadata and image determination, according, according to some aspects.

FIG. 4 is a flowchart for a method 400 for metadata and image determination, according to some aspects. Method 400 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1 and 3. However, method 400 is not limited to that example aspect.

At 402, a set of metadata is received. For example, the metadata and image determination system 150 and/or the linking determination system 303 can receive a set of metadata. In some aspects, the metadata and image determination system 150 and/or the linking determination system 303 receives the set of metadata from a plurality of sources. The set of metadata can be associated with an item of content. Additionally, or alternatively, the set of metadata can be part of a second set of metadata that are associated with different items of content and the linking determination system 303 is configured to determine the set of metadata from the second set of metadata. As discussed above with respect to FIG. 3, the linking determination system 303 can select, from the second set of metadata, the set of metadata associated with the item of content and link the set of metadata for generating a final metadata.

In some aspects, the linking determination system 303 selects the set of metadata from the second set of metadata using an embedding model. Additionally, or alternatively, the linking determination system 303 links the set of metadata using a logistic regression model. Additionally, or alternatively, the linking determination system 303 links the set of metadata using a deduplication model. However, other machine learning models and/or AI models can be used to select the set of metadata associated with the item of content and to link the set of metadata.

According to some aspects, the content can be movies. Additionally, or alternatively, the content can be an episode of an episodic content. According to some aspects, the episodic content includes a content having one or more episodes. For example, the episodic content can include one or more seasons and each season of the episodic content can include one or more episodes. The episodic content can include any type of shows with one or more episodes. However, the aspects of this disclosure are not limited to these examples and types of content, and the content can include one or more of sports, music, music videos, persons, artwork, audiobooks, audio recordings, their subclasses, or the like received from sources. Similarly, the aspects of this disclosure are not limited to the example metadata discussed and can include any type of metadata and information provided by the sources.

According to some aspects, the content and/or the metadata can be organized in any hierarchal complexity depending on the type of the content and/or the type of the metadata. For example, the content and/or the metadata can be organized in any particular set or combination. As a non-limiting example, the content and/or the metadata can be organized as series→seasons→episodes; sport type→conference→division→season→team→game; or the like.

At 404, a first quality metric for each metadata of the set of metadata is determined. For example, the metadata and image determination system 150 and/or the metrics determination system 305 can determine the first quality metric for each metadata of the set of metadata. As discussed above with respect to FIG. 3, the first quality metric includes a completeness metric and determining the first quality metric for each metadata can include comparing attributes of first metadata to attributes of other metadata of the set of metadata and determining whether the attributes of the other metadata include information not present in the attributes of first metadata. Determining the first quality metric can further include determining the first quality metric for the first metadata based at least on determining whether the attributes of the other metadata include information not present in the attributes of first metadata.

At 406, a set of quality metrics for attributes of each metadata of the set of metadata is determined. For example, the metrics determination system 305 can determine the set of quality metrics for attributes of each metadata of the set of metadata. For example, the metrics determination system 305 can determine an accuracy quality metric for each attribute (e.g., each non-empty attribute) of each metadata of the set of metadata.

At 408, a second quality metric for each metadata of the set of metadata is determined based at least on the set of quality metrics. For example, the metrics determination system 305 can determine the second quality metric for each metadata of the set of metadata based at least on the set of quality metrics. For example, the metrics determination system 305 can determine the second quality metric for each metadata based on the set of accuracy quality metrics of the attributes of that metadata. In some aspects, the metrics determination system 305 can determine the second quality metric as a vector including the set of accuracy quality metrics of the attributes. In some aspects, the metrics determination system 305 can determine the second quality metric as an average (e.g., a weighted average) of the set of accuracy quality metrics of the attributes. In some aspects, the metrics determination system 305 can determine the second quality metric as other statistical average of the set of accuracy quality metrics of the attributes. However, other methods such as, but not limited to, statistical methods, AI/ML models, heuristics, and/or any combination of methods can be used to determine the second quality metric.

At 410, a final metadata is generated (and/or selected) based at least on the set of metadata, the first quality metric, and the second quality metric. For example, the metrics determination system 305 can generate (and/or select) a final metadata based at least on one or more of the set of metadata, the first quality metric, and the second quality metric. The final metadata is associated with the item of content. In some aspects, the metrics determination system 305 can generate the final metadata from the attributes of the set of metadata based at least on the first quality metric and/or the second quality metric. For example, the metrics determination system 305 can choose different attributes from different metadata of the set of metadata based at least on the first quality metric and/or the second quality metric to generate the final metadata. Additionally, or alternatively, the metrics determination system 305 can select one metadata from the set of metadata based at least on the first quality metric and/or the second quality metric to generate the final metadata. The metrics determination system 305 can be configured to enrich the final metadata based at least on the set of metadata, the first quality metric, and/or the second quality metric.

In some aspects, the final metadata includes a plurality of attributes determined from the attributes of each metadata of the set of metadata based at least on the first quality metric and the second quality metric. The plurality of metadata can include at least one or more of a title of series, a title of the episode, a description of the episode, cast information of the episode, quality information associated with the episode, or a duration of the episode.

At 412, the final metadata associated with the item of content is provided to, for example, a media system such as the media system 104 of FIG. 1. Additionally, or alternatively, the item of content and the final metadata associated with the item of content are provided to, for example, the media system. For example, the metadata and image determination system 150 and/or the metrics determination system 305 can provide the item of content and the final metadata associated with the item of content to, for example, the media system.

In some aspects, operation 412 can further include displaying, on a display device associated with the media device, the final metadata and displaying, on the display device associated with the media device, information associated with one or more sources of the plurality of sources that carry the item of content.

As discussed above, the first quality metric and/or the second quality metric can be determined at content level and/or at source level. For example, method 400 can further include determining a first source quality metric for each source of the plurality of sources based on the first quality metric of each metadata of the set of metadata associated with the corresponding source. Additionally, or alternatively, method 400 can further include determining a second source quality metric for each source of the plurality of sources based on the second quality metric of each metadata of the set of metadata associated with the corresponding source.

In addition to determining the first quality metric and/or the second quality metric, method 400 can further include determining one or more image quality metrics associated with the item of content. For example, method 400 can further include receiving, from a second plurality of sources, a plurality of images associated with the item of content, determining an image quality metric for each image of the plurality of images, and selecting an image from the plurality of images based on the image quality metric. In some aspects, the sources for the images can be the same as the sources for the metadata. Additionally, or alternatively, the sources for the images can be the different than the sources for the metadata.

Method 400 can further include providing the selected image associated with the item of content to, for example, a media system such as the media system 104 of FIG. 1. Additionally, or alternatively, the item of content and the selected image associated with the item of content are provided to, for example, the media system. For example, the metadata and image determination system 150 and/or the metrics determination system 305 can provide the item of content and the selected image associated with the item of content to, for example, the media system. In some aspects, method 400 can further include displaying, on a display device associated with the media device, the selected image and displaying, on the display device associated with the media device, information associated with one or more sources of the plurality of sources that carry the item of content.

According to some aspects, method 400 can further include receiving additional metadata and/or images from one or more source. For example, the metadata and image determination system 150 can receive the additional metadata and/or images. The metadata and image determination system 150 can determine one or more metadata clusters and/or one or more image clusters to group the received additional metadata and/or images. The metadata and image determination system 150 can use similar operations discussed above to group the received additional metadata and/or images. Additionally, or alternatively, the metadata and image determination system 150 can generate one or more metadata clusters and/or one or more image clusters to group the received additional metadata and/or images. The metadata and image determination system 150 can determine one or more of the first quality metric, the second quality metric, and the image quality metric for the received additional metadata and/or images. The metadata and image determination system 150 can then update the final metadata and/or the selected image based on the \ first quality metric, the second quality metric, and/or the image quality metric for the received additional metadata and/or images.

Example Computer System

Figure 5:
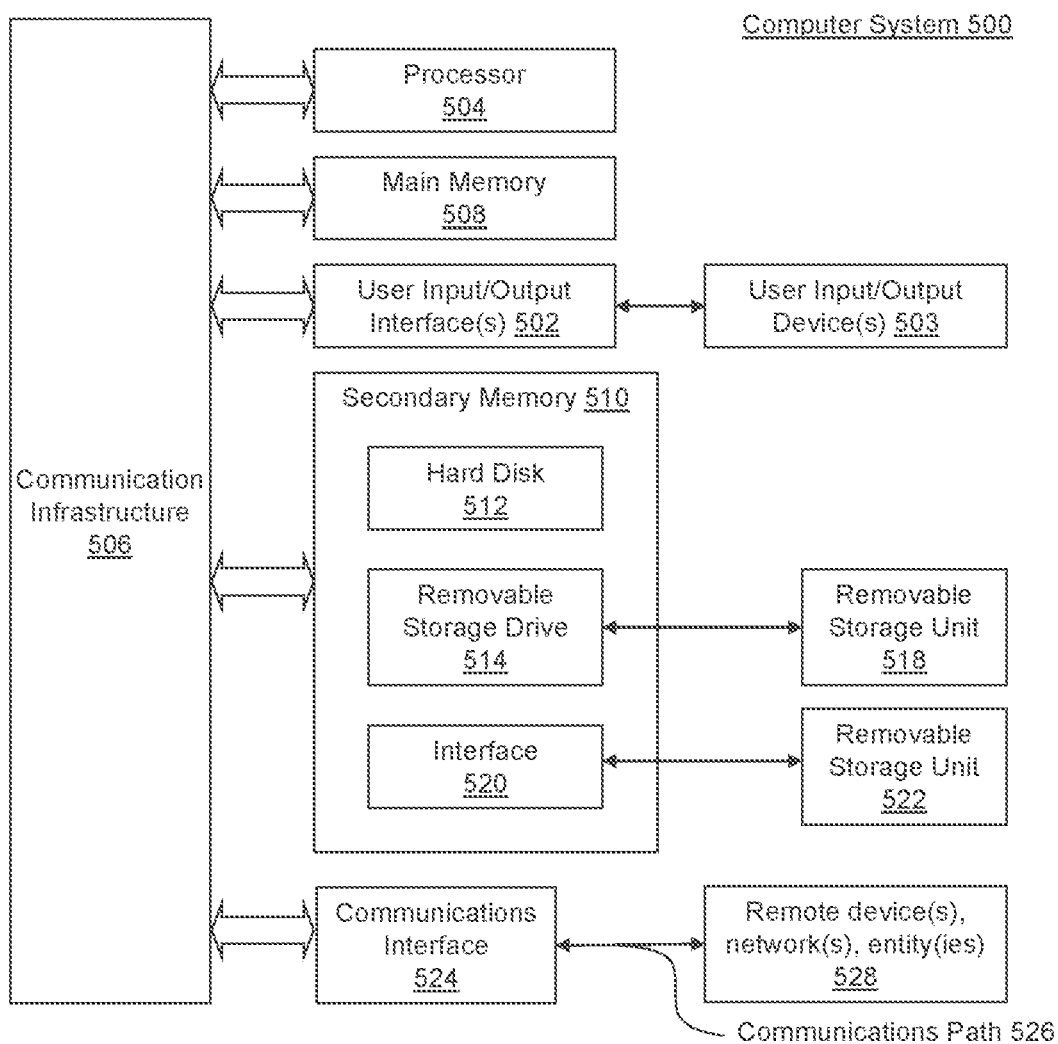
FIG. 5 illustrates an example computer system that can be used for implementing various aspects.

Various aspects may be implemented, for example, using one or more computer systems, such as computer system 500 shown in FIG. 5. For example, the metadata and image determination system 150 may be implemented using combinations or sub-combinations of computer system 500. Also or alternatively, one or more computer systems 500 may be used, for example, to implement any of the aspects discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an aspect, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 5. In particular, aspects can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A computer-implemented method, comprising:
    receiving, by at least one computer processor and from a plurality of sources, a set of metadata associated with an item of content;
    determining, by the at least one computer processor, a first quality metric for each metadata of the set of metadata;
    determining a set of quality metrics for attributes of each metadata of the set of metadata;
    determining a second quality metric for each metadata of the set of metadata based on the set of quality metrics;
    generating a final metadata based at least on the set of metadata, the first quality metric, and the second quality metric; and
    providing the item of content and the final metadata associated with the item of content, wherein the item of content comprises at least an episode in a series.

2. The computer-implemented method of claim 1, further comprising:
    receiving, from a second plurality of sources, a plurality of images associated with the item of content;
    determining an image quality metric for each image of the plurality of images; and
    selecting an image from the plurality of images based on the image quality metric.

3. The computer-implemented method of claim 1, wherein the first quality metric comprises a completeness metric and determining the first quality metric for each metadata comprises:
    comparing attributes of first metadata to attributes of other metadata of the set of metadata;
    determining whether the attributes of the other metadata include information not present in the attributes of the first metadata; and
    determining the first quality metric for the first metadata based at least on determining whether the attributes of the other metadata include information not present in the attributes of the first metadata.

4. The computer-implemented method of claim 1, further comprising:
    receiving, from the plurality of sources, a second set of metadata;
    selecting, from the second set of metadata, the set of metadata associated with the item of content; and
    linking the set of metadata for generating the final metadata.

5. The computer-implemented method of claim 4, wherein selecting the set of metadata comprises using an embedding model to select the set of metadata.

6. The computer-implemented method of claim 4, wherein linking the set of metadata comprises using a logistic regression model to link the set of metadata.

7. The computer-implemented method of claim 4, wherein linking the set of metadata comprises using a deduplication model to link the set of metadata.

8. The computer-implemented method of claim 1, wherein:
    the final metadata comprises a plurality of attributes determined from the attributes of each metadata of the set of metadata based at least on the first quality metric and the second quality metric, and
    the plurality of metadata comprises at least one or more of a title of the series, a title of the episode, a description of the episode, cast information of the episode, quality information associated with the episode, or a duration of the episode.

9. The computer-implemented method of claim 1, further comprising:
    determining a first source quality metric for each source of the plurality of sources based on the first quality metric of each metadata of the set of metadata associated with the corresponding source.

10. The computer-implemented method of claim 9, further comprising:
    determining a second source quality metric for each source of the plurality of sources based on the second quality metric of each metadata of the set of metadata associated with the corresponding source.

11. The computer-implemented method of claim 1, further comprising:
displaying, on a display device associated with a media device, the final metadata; and
displaying, on the display device associated with the media device, information associated with one or more sources of the plurality of sources that carry the item of content.

12. A non-transitory computer-readable medium having instructions stored thereon that, when executed by at least one computing device, cause the at least one computing device to perform operations comprising:
receiving, from a plurality of sources, a set of metadata associated with an item of content;
determining a first quality metric for each metadata of the set of metadata;
determining a set of quality metrics for attributes of each metadata of the set of metadata;
determining a second quality metric for each metadata of the set of metadata based on the set of quality metrics;
generating a final metadata based at least on the set of metadata, the first quality metric, and the second quality metric; and
providing the item of content and the final metadata associated with the item of content, wherein the item of content comprises at least an episode in a series.

13. The non-transitory computer-readable medium of claim 12, wherein the operations further comprise:
receiving, from a second plurality of sources, a plurality of images associated with the item of content;
determining an image quality metric for each image of the plurality of images; and
selecting an image from the plurality of images based on the image quality metric.

14. The non-transitory computer-readable medium of claim 12, wherein the first quality metric comprises a completeness metric and determining the first quality metric for each metadata comprises:
comparing attributes of first metadata to attributes of other metadata of the set of metadata;
determining whether the attributes of the other metadata include information not present in the attributes of the first metadata; and
determining the first quality metric for the first metadata based at least on determining whether the attributes of the other metadata include information not present in the attributes of the first metadata.

15. The non-transitory computer-readable medium of claim 12, wherein the operations further comprise:
receiving, from the plurality of sources, a second set of metadata;
selecting, from the second set of metadata, the set of metadata associated with the item of content; and
linking the set of metadata for generating the final metadata.

16. The non-transitory computer-readable medium of claim 15, wherein:
selecting the set of metadata comprises using an embedding model to select the set of metadata, and
linking the set of metadata comprises using a logistic regression model or a deduplication model to link the set of metadata.

17. The non-transitory computer-readable medium of claim 12, wherein:
the final metadata comprises a plurality of attributes determined from the attributes of each metadata of the set of metadata based at least on the first quality metric and the second quality metric, and
the plurality of metadata comprises at least one or more of a title of the series, a title of the episode, a description of the episode, cast information of the episode, quality information associated with the episode, or a duration of the episode.

18. The non-transitory computer-readable medium of claim 12, wherein the operations further comprise:
determining a first source quality metric for each source of the plurality of sources based on the first quality metric of each metadata of the set of metadata associated with the corresponding source.

19. The non-transitory computer-readable medium of claim 12, wherein the operations further comprise:
determining a second source quality metric for each source of the plurality of sources based on the second quality metric of each metadata of the set of metadata associated with the corresponding source;
displaying, on a display device associated with a media device, the final metadata; and
displaying, on the display device associated with the media device, information associated with one or more sources of the plurality of sources that carry the item of content.

20. A system, comprising:
one or more memories; and
at least one processor each coupled to at least one of the memories and configured to perform operations comprising:
receiving, from a plurality of sources, a set of metadata associated with an item of content;
determining a first quality metric for each metadata of the set of metadata;
determining a set of quality metrics for attributes of each metadata of the set of metadata;
determining a second quality metric for each metadata of the set of metadata based on the set of quality metrics;
generating a final metadata based at least on the set of metadata, the first quality metric, and the second quality metric; and
providing the item of content and the final metadata associated with the item of content, wherein the item of content comprises at least an episode in a series.

* * * * *